United States Patent
Zhang et al.

(10) Patent No.: US 11,252,671 B2
(45) Date of Patent: Feb. 15, 2022

(54) POWER CONTROL METHOD AND APPARATUS

(71) Applicant: Huawei Technologies Co., Ltd., Shenzhen (CN)

(72) Inventors: Qian Zhang, Beijing (CN); Xingwei Zhang, Lund (SE); Zhe Liu, Beijing (CN); Shulan Feng, Beijing (CN); Meng Deng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/992,904

(22) Filed: Aug. 13, 2020

(65) Prior Publication Data
US 2020/0374808 A1 Nov. 26, 2020

Related U.S. Application Data

(63) Continuation of application No. PCT/CN2019/074646, filed on Feb. 2, 2019.

(30) Foreign Application Priority Data

Feb. 14, 2018 (CN) .......................... 201810152273.6

(51) Int. Cl.
*H04W 52/14* (2009.01)
*H04W 52/36* (2009.01)
*H04W 52/42* (2009.01)

(52) U.S. Cl.
CPC ....... *H04W 52/146* (2013.01); *H04W 52/367* (2013.01); *H04W 52/42* (2013.01)

(58) Field of Classification Search
CPC ........... H04W 52/00–60; H04W 76/15; H04W 76/16
See application file for complete search history.

(56) References Cited

U.S. PATENT DOCUMENTS

2013/0324143 A1* 12/2013 Yokomakura ......... H04L 5/0073
455/452.1
2014/0004867 A1* 1/2014 Noh ...................... H04W 76/14
455/450
(Continued)

FOREIGN PATENT DOCUMENTS

CN 106031257 A 10/2016
CN 106465293 A 2/2017
(Continued)

OTHER PUBLICATIONS

Huawei et al., "TP on Power control for LTE-NR NSA operation," 3GPP TSG RAN WG1 Ad Hoc Meeting, R1-1801177, Vancouver, Canada, Jan. 22-26, 2018, 3 pages.
(Continued)

*Primary Examiner* — Raymond S Dean
(74) *Attorney, Agent, or Firm* — Slater Matsil, LLP

(57) ABSTRACT

A power control method and apparatus are provided. The method includes: A communications device receives a first power value and a second power value that are configured by a network side. The first power value is a maximum allowed transmit power value that is for a first cell group and that is configured by the network side for the communications device, and the second power value is a maximum allowed transmit power value that is for a second cell group and that is configured by the network side for the communications device. The communications device determines, based on the first power value and the second power value, a total guaranteed power value that is of the communications device and that applies to a case in which a resource in the first cell group overlaps a resource in the second cell group.

17 Claims, 5 Drawing Sheets

(56) References Cited

U.S. PATENT DOCUMENTS

| | | | | |
|---|---|---|---|---|
| 2016/0242128 | A1* | 8/2016 | Loehr | H04W 52/367 |
| 2016/0323834 | A1* | 11/2016 | Rahman | H04J 11/0083 |
| 2017/0078977 | A1 | 3/2017 | Park | |
| 2019/0253976 | A1* | 8/2019 | Pelletier | H04W 52/346 |
| 2019/0268930 | A1* | 8/2019 | Rudolf | H04L 5/0094 |
| 2020/0163023 | A1* | 5/2020 | Pelletier | H04W 72/042 |

FOREIGN PATENT DOCUMENTS

| | | |
|---|---|---|
| CN | 107690154 A | 2/2018 |
| WO | 2015166974 A1 | 11/2015 |
| WO | 2015170726 A1 | 11/2015 |

OTHER PUBLICATIONS

Interdigital Inc. et al., "TP for 38.817-01- Power Sharing—Pcmax for EN-DC in sub-6Ghz," TSG-RAN Working Group 4 (Radio) AH-1801, R4-1800264, San Diego, Ca, USA, Jan. 22-26, 2018, 4 pages.

Ad Hoc Chair (Ericsson), "Chairman's Notes of AI 7.6," 3GPP TSG RAN WG1 Meeting AH 1801, R1-1801133, Vancouver, Canada, Jan. 22-26, 2018, 4 pages.

Nokia et al., "UE Dynamic power sharing for LTE-NR Dual Connectivity," 3GPP TSG RAN WG1 Meeting AH 1801, R1-1800942, Vancouver, Canada, Jan. 22-26, 2018, 5 pages.

Huawei et al., "TP on Power control for LTE-NR NSA operation," 3GPP TSG RAN WG1 Ad Hoc Meeting, R1-1801171, Vancouver, Canada, Jan. 22-26, 2018, 2018, 3 pages.

QUALCOMM Inc., "Power sharing for EN-DC," 3GPP TSG RAN WG4 Meeting NR-AH#1801, R4-1800398, San Diego, CA, USA, Jan. 18-21, 2018, 5 pages.

QUALCOMM Inc., "Way Forward on NR EN-DC power sharing capability," 3GPP RAN #78, RP-172833, Lisbon, Portugal, Dec. 18-21, 2017, 6 pages.

3rd Generation Partnership Project; Technical Specification Group Radio Access Network; Evolved Universal Terrestrial Radio Access (E-UTRA); User Equipment (UE) radio transmission and reception (Release 15), 3GPP TS 36.101 V15.1.0 (Dec. 2017), 1635 pages.

3rd Generation Partnership Project; Technical Specification Group Radio Access Network; Evolved Universal Terrestrial Radio Access (E-UTRA); Physical layer procedures (Release 15), 3GPP TS 36.213 V15.0.0 (Dec. 2017), 493 pages.

3rd Generation Partnership Project; Technical Specification Group Radio Access Network; NR; User Equipment (UE) radio transmission and reception; Part 1: Range 1 Standalone (Release 15), 3GPP TS 38.101-1 V15.0.0 (Dec. 2017), 49 pages.

3rd Generation Partnership Project; Technical Specification Group Radio Access Network; NR; User Equipment (UE) radio transmission and reception; Part 2: Range 2 Standalone (Release 15), 3GPP TS 38.101-2 V15.0.0 (Dec. 2017), 38 pages.

NTT DOCOMO, "Summary of email discussion [77-13]: Details of PxeNB for power-control of dual connectivity", 3GPP TSG RAN WG1 Meeting #77, R1-142778, Seoul, Korea, May 19-23, 2014, 8 pages.

Ericsson et al., "TP for LTE-NR power sharing", 3GPP TSG-RAN WG1 AH 1801, R1-1801258, Vancouver, Canada, Jan. 22-26, 2018, 4 pages.

Huawei et al., "TP on Power control for LTE-NR NSA operation", 3GPP TSG RAN WG1 Ad Hoc Meeting, R1-1801273, Vancouver, Canada, Jan. 22-26, 2018, 4 pages.

\* cited by examiner

POWER CONTROL METHOD AND APPARATUS

CROSS-REFERENCE TO RELATED APPLICATIONS

This application is a continuation of International Application No. PCT/CN2019/074646, filed on Feb. 2, 2019, which claims priority to Chinese Patent Application No. 201810152273.6, filed on Feb. 14, 2018. The disclosures of the aforementioned applications are hereby incorporated by reference in their entireties.

TECHNICAL FIELD

This application relates to the field of information technologies, and in particular, to a power control method and apparatus.

BACKGROUND

A dual connectivity (DC) technology is introduced in a standard protocol Release 12. The DC technology enables a terminal device to be connected to two cell groups at the same time. For example, a first cell group may be a long term evolution (LTE) cell, and a second cell group may be a new radio (NR) cell.

In addition, the standard protocol further specifies that when the terminal device is in a DC state, the terminal device may send an uplink signal to a master base station and send an uplink signal to a secondary base station at the same time. A sum of a power used for sending the uplink signal to the master base station and a power used for sending the uplink signal to the secondary base station cannot exceed a preset maximum power. For example, if the power used by the terminal device to send the uplink signal to the master base station is a first power, and the power used by the terminal device to send the uplink signal to the secondary base station is a second power, it needs to be always ensured that a sum of the first power and the second power is less than or equal to the maximum power.

Currently, in the prior art, only a manner for performing DC power control in a same communications mode is provided, but no related technology is provided for performing DC power control across different communications modes, for example, power control for dual connectivity between E-UTRAN and NR.

SUMMARY

In view of this, this application provides a power control method and apparatus, so as to effectively perform power control for a dual connectivity communications device across different communications modes.

According to a first aspect, an embodiment of this application provides a power control method. The method includes: A communications device first receives a first power value and a second power value that are configured by a network side, where the first power value is a maximum allowed transmit power value that is for a first cell group and that is configured by the network side for the communications device, and the second power value is a maximum allowed transmit power value that is for a second cell group and that is configured by the network side for the communications device. Then, the communications device determines, based on the first power value and the second power value, a total guaranteed power value that is of the communications device and that applies to a case in which a resource in the first cell group overlaps a resource in the second cell group. In this case, when being in a state of DC across different communications modes, the communications device sends an uplink signal to both a master base station and a secondary base station, and a sum of powers used for sending the signal does not exceed the total guaranteed power. Therefore, a received power for receiving the signal on the network side can meet a receiving requirement, and signal interference is not caused.

In a possible design, the communications device operates in a dual connectivity mode, and the dual connectivity mode indicates that the communications device can establish a connection to the first cell group and the second cell group at the same time. For example, the first cell group includes one or more LTE cells, and the second cell group includes one or more NR cells.

In another possible design, the communications device determines a first guaranteed power value of the communications device in the first cell group based on the first power value; the communications device determines a second guaranteed power value of the communications device in the second cell group based on the second power value; the communications device determines a minimum power value based on a sum of the first power value and the second power value, and at least one of the following power values: a sum of the first guaranteed power value and the second guaranteed power value, and a larger one of the fourth power value and the fifth power value; and the communications device uses the minimum power value as the total guaranteed power value that is of the communications device and that applies to the case in which a resource in the first cell group overlaps a resource in the second cell group.

The fourth power value is a maximum allowed transmit power value of the communications device in the first cell group, for example, a maximum allowed transmit power value in the LTE cell. The fifth power value is a maximum allowed transmit power value of the communications device in the second cell group, for example, a maximum allowed transmit power value in the NR cell.

In a third possible design, a time at which a subframe in the first cell group overlaps a subframe in the second cell group is a first time unit, the first time unit corresponds to a subframe p in the first cell group and corresponds to slots q to q+n in the second cell group, and a value of n indicates a time domain position of a last slot that is in the second cell group and that overlaps the subframe p in the first cell group.

Further, the communications device determines an actual total guaranteed power value based on n+1 total guaranteed power values corresponding to the slots q to q+n, where the actual total guaranteed power value is a maximum allowed transmit power value that can be used by the communications device in the first time unit.

According to a second aspect, an embodiment of this application further provides a power control method. First, a communications device receives a first power value configured by a network side, where the first power value is a maximum allowed transmit power value that is for a cell group and that is configured by the network side for the communications device. Then, the communications device determines a first guaranteed power value of the communications device in the cell group based on the first power value.

In this way, assuming that there is a plurality of LTE cells in the cell group, the communications device may determine a first guaranteed power value of the communications device in the plurality of LTE cells based on the first power value configured by the network side. Similarly, assuming that there is plurality of NR cells in the cell group, the communications device may determine a second guaranteed power value of the communications device in the plurality of NR cells based on the first power value configured by the network side.

In a possible design, the communications device operates in a dual connectivity mode, and the dual connectivity mode indicates that the communications device can establish a connection to the first cell group and the second cell group at the same time. For example, the first cell group includes one or more LTE cells, and the second cell group includes one or more NR cells.

In another possible design, the communications device determines a minimum power value based on the first power value and at least one of a third power value and a fourth power value, and uses the minimum power value as the first guaranteed power value of the communications device in the cell group.

The third power value is a maximum allowed transmit power value configured by the network side for the communications device, and the fourth power value is a maximum allowed transmit power value of the communications device.

It should be noted that, in the foregoing embodiment, different determining manners may be combined together. In other words, a power may be configured for the communications device based on at least one of the foregoing conditions.

According to a third aspect, an embodiment of this application further provides an apparatus, where the apparatus has a function of implementing an action of the communications device in the method example in the first aspect. The function may be implemented by hardware, or may be implemented by hardware executing corresponding software. The hardware or the software includes one or more modules corresponding to the foregoing function.

In a possible design, the apparatus includes a receiving unit and a processing unit. The receiving unit is configured to receive a first power value and a second power value that are configured by a network side, where the first power value is a maximum allowed transmit power value that is for a first cell group and that is configured by the network side for the communications device, and the second power value is a maximum allowed transmit power value that is for a second cell group and that is configured by the network side for the communications device.

The processing unit is configured to determine, based on the first power value and the second power value, a total guaranteed power value that is of the communications device and that applies to a case in which a resource in the first cell group overlaps a resource in the second cell group.

In a possible design, the communications device operates in a dual connectivity mode, and the dual connectivity mode indicates that the communications device can establish a connection to the first cell group and the second cell group at the same time. For example, the first cell group includes one or more LTE cells, and the second cell group includes one or more NR cells. In this case, when being in a state of DC across different communications modes, the communications device sends an uplink signal to both a master base station and a secondary base station, and a sum of powers used for sending the signal does not exceed the total guaranteed power. Therefore, a received power for receiving the signal on the network side can meet a receiving requirement, and signal interference is not caused.

In a possible design, the processing unit is further configured to: determine a first guaranteed power value of the communications device in the first cell group based on the first power value; determine a second guaranteed power value of the communications device in the second cell group based on the second power value; determine a minimum power value based on a sum of the first power value and the second power value, and at least one of the following power values: a sum of the first guaranteed power value and the second guaranteed power value, and a larger one of the fourth power value and the fifth power value; and use the minimum power value as the total guaranteed power value that is of the communications device and that applies to the case in which a resource in the first cell group overlaps a resource in the second cell group.

The fourth power value is a maximum allowed transmit power value of the communications device in the first cell group, and the fifth power value is a maximum allowed transmit power value of the communications device in the second cell group.

In another possible design, a time at which a subframe in the first cell group overlaps a subframe in the second cell group is a first time unit, the first time unit corresponds to a subframe p in the first cell group and corresponds to slots q to q+n in the second cell group, and a value of n indicates a time domain position of a last slot that is in the second cell group and that overlaps the subframe p in the first cell group.

The processing unit is further configured to determine an actual total guaranteed power value based on n+1 total guaranteed power values corresponding to the slots q to q+n, where the actual total guaranteed power value is a maximum allowed transmit power value that can be used by the communications device in the first time unit.

During implementation of this application, these units may perform corresponding functions in the method example in the first aspect. For details, refer to the detailed descriptions in the method example. Details are not described herein again.

In another possible design, when the apparatus is a chip in the communications device, the chip includes a processing unit and a communications unit. The processing unit may be, for example, a processor, and the communications unit may be, for example, an input/output interface, a pin, or a circuit. The processing unit may execute a computer-executable instruction stored in a storage unit, to enable the power control method in any design of the first aspect to be performed. Optionally, the storage unit is a storage unit in the chip, such as a register or a cache. Alternatively, the storage unit may be a storage unit located in the communications device but outside the chip, such as a read-only memory, another type of static storage device that can store static information and an instruction, or a random access memory.

According to a fourth aspect, an embodiment of this application further provides an apparatus, where the apparatus has a function of implementing an action of the network device in the method example in the second aspect. The function may be implemented by hardware, or may be implemented by hardware executing corresponding software. The hardware or the software includes one or more modules corresponding to the foregoing function.

In a possible design, the apparatus includes a receiving unit and a processing unit. The receiving unit is configured to receive a first power value configured by a network side, where the first power value is a maximum allowed transmit power value that is for a cell group and that is configured by the network side for the communications device. The processing unit is configured to determine a first guaranteed power value of the communications device in the cell group based on the first power value.

In a possible design, the communications device operates in a dual connectivity mode, and the dual connectivity mode indicates that the communications device can establish a connection to the first cell group and the second cell group at the same time. For example, the first cell group includes one or more LTE cells, and the second cell group includes one or more NR cells. In this case, when being in a state of DC across different communications modes, the communications device sends an uplink signal to both a master base station and a secondary base station, and a sum of powers used for sending the signal does not exceed the total guaranteed power. Therefore, a received power for receiving the signal on the network side can meet a receiving requirement, and signal interference is not caused.

In another possible design, the processing unit is specifically configured to: determine a minimum power value based on the first power value and at least one of a third power value and a fourth power value; and use the minimum power value as the first guaranteed power value of the communications device in the cell group.

The third power value is a maximum allowed transmit power value configured by the network side for the communications device, and the fourth power value is a maximum allowed transmit power value of the communications device.

During implementation of this application, these units may perform corresponding functions in the method example in the second aspect. For details, refer to the detailed descriptions in the method example. Details are not described herein again.

In another possible design, when the apparatus is a chip in the network device, the chip includes a processing unit and a communications unit. The processing unit may be, for example, a processor, and the communications unit may be, for example, an input/output interface, a pin, or a circuit. The processing unit may execute a computer-executable instruction stored in a storage unit, to enable the power control method in any design of the first aspect to be performed. Optionally, the storage unit is a storage unit in the chip, such as a register or a cache. Alternatively, the storage unit may be a storage unit located in the communications device but outside the chip, such as a read-only memory, another type of static storage device that can store static information and an instruction, or a random access memory.

According to a fifth aspect, an embodiment of this application provides an apparatus, including at least one processor and at least one memory, where the processor is configured to perform the power control method in either the first aspect or the second aspect, and the memory is coupled to the processor.

According to a sixth aspect, an embodiment of this application provides an apparatus, including at least one processor and at least one memory. The at least one memory is coupled to the at least one processor. The at least one memory is configured to store computer program code, where the computer program code includes a computer instruction, and when the at least one processor executes the computer instruction, the apparatus performs the power control method in either the first aspect or the second aspect.

According to a seventh aspect, an embodiment of this application provides an apparatus, including at least one processor, where the processor is configured to perform the power control method in any one of the first aspect or the second aspect.

According to an eighth aspect, an embodiment of this application provides a chip. The chip exists in a form of an apparatus, and the chip may be any apparatus in the foregoing aspects.

The power control method provided in the embodiments of this application is applicable to a dual connectivity system across different communications modes, for example, an LTE-NR dual connectivity system. In this case, a maximum allowed transmit power is configured by a network side for a cell corresponding to each of the modes. Then, based on the maximum allowed transmit power configured by the network side and an allowed transmit power of the communications device, a communications device determines a maximum allowed transmit power of the communications device in a cell corresponding to the communications mode. Because dual connectivity corresponds to two types of cells, the communications device further needs to ensure that a final transmit power does not exceed a total guaranteed power. The total guaranteed power is determined by the communications device based on the maximum allowed transmit power value configured by the network side. In this case, when being in a state of DC across different communications modes, the communications device sends an uplink signal to both a master base station and a secondary base station, and a sum of powers used for sending the signal does not exceed the total guaranteed power. Therefore, a received power for receiving the signal on the network side can meet a receiving requirement, and signal interference is not caused.

DETAILED DESCRIPTION OF ILLUSTRATIVE EMBODIMENTS

The following further describes in detail this application with reference to the accompanying drawings.

Figure 1:
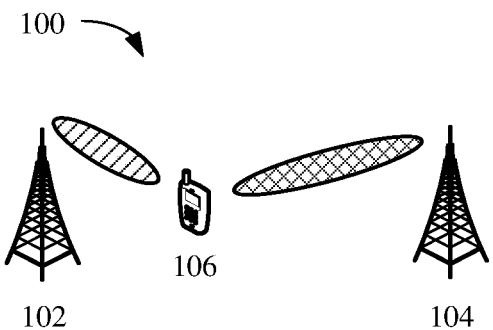
FIG. 1 is a schematic architectural diagram of a communications system according to an embodiment of this application.

For ease of understanding the embodiments of this application, a communications system shown in FIG. 1 is first used as an example to describe in detail a communications system applicable to the embodiments of this application. FIG. 1 is a schematic diagram of a communications system 100 to which a communication method according to an embodiment of this application is applicable. As shown in FIG. 1, the communications system 100 includes a network device 102 and a terminal device 106. The network device 102 may be equipped with a plurality of antennas, and the terminal device 106 may also be equipped with a plurality of antennas. Optionally, the communications system may further include a network device 104, and the network device 104 may also be equipped with a plurality of antennas.

It should be understood that the network device 102 or the network device 104 may further include a plurality of components (for example, a processor, a modulator, a multiplexer, a demodulator, or a demultiplexer) related to signal sending and receiving.

The network device is a device having a wireless transceiving function or a chip that may be disposed in the device. The device includes but is not limited to: an evolved NodeB (eNB), a radio network controller (RNC), a NodeB (Node B, NB), a base station controller (BSC), a base transceiver station (BTS), a home NodeB (for example, a home evolved NodeB, or a home Node B, HNB), a baseband unit (BBU), or an access point (AP), a wireless relay node, a wireless backhaul node, a transmission point (transmission and reception point, TRP or transmission point, TP), or the like in a wireless fidelity (WIFI) system. Alternatively, the network device may be a gNB or a transmission point (TRP or TP) in a 5G system, such as an NR system, or one antenna panel or a group of antenna panels (including a plurality of antenna panels) of a base station in a 5G system; or may be a network node that constitutes a gNB or a transmission point, for example, a baseband unit (BBU), or a distributed unit (DU).

In some deployment, the gNB may include a centralized unit (CU) and a DU. The gNB may further include a radio frequency unit (radio unit, RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer is eventually converted into information at the PHY layer, or is converted from information at the PHY layer. Therefore, in this architecture, higher layer signaling, such as RRC layer signaling or PHCP layer signaling, may also be considered as being sent by the DU or sent by the DU and the RU. It may be understood that the network device may be a CU node, a DU node, or a device including a CU node and a DU node. In addition, the CU may be classified into a network device in an access network RAN, or the CU may be classified into a network device in a core network CN. This is not limited herein.

The communications device may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device in the embodiments of this application may be a mobile phone, a tablet (Pad), a computer with a wireless transceiving function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application. For ease of description, in the following of this application, the foregoing communications device and a chip that may be disposed in the foregoing communications device are collectively referred to as a terminal device.

In the communications system 100, the network device 102 and the network device 104 each may communicate with a plurality of terminal devices (for example, the terminal device 106 shown in the figure). The network device 102 and the network device 104 may communicate with any quantity of terminal devices similar to the terminal device 106. However, it should be understood that a terminal device communicating with the network device 102 and a terminal device communicating with the network device 104 may be the same or may be different. The terminal device 106 shown in FIG. 1 may communicate with both the network device 102 and the network device 104, but this shows only a possible scenario. In some scenarios, the terminal device may communicate with only the network device 102 or the network device 104. This is not limited in this application.

It should be understood that FIG. 1 is merely a simplified schematic diagram used as an example for ease of understanding. The communications system may further include another network device or another terminal device, which is not shown in FIG. 1.

An embodiment of this application provides a power control method. Link adaptation, power control, and the like are usually important management functions in a communications system, to improve system performance. In a communications network, at least one node sends a signal to another node, and a purpose of power control is to enable a power of the signal sent by the at least one node to meet a system requirement when the signal arrives to the another node in the network.

The node herein may be a base station, user equipment, or the like. For example, power control may enable a power of a signal sent by a user device to meet a specific power requirement when the signal arrives to another user. For another example, power control may enable a power of a signal sent by a user to meet a power requirement of a base station when the signal arrives to the base station. For still another example, power control may enable a power of a signal sent by a base station to meet a power requirement of user equipment when the signal arrives to the user equipment.

A power requirement in power control may be a power requirement upon arrival to a node. For example, if a signal is a wanted signal for the node, a power used by the node to receive the signal needs to meet a demodulation threshold, and the power for receiving the signal should not be too low. If the power for receiving the signal is too low, the signal cannot be correctly received or demodulated. Alternatively, for example, if a signal is an unwanted signal for the node, such as an interfering signal, a power used by the node to receive the signal needs to meet an interference threshold, and the power for receiving the signal should not be too high. If the power for receiving the signal is too high, the signal causes a relatively strong interference to a wanted signal of the node.

Power control may be performed between one node and another node. For example, in a D2D scenario, power control is to enable a power of a signal from one user equipment to another user equipment to meet a specific signal to interference plus noise ratio (SINR). Alternatively, power control may be performed between a plurality of nodes and one node. For example, in the uplink in LTE, power control is to enable a power of a signal from at least one user equipment in a network to meet a signal to interference plus noise ratio SINR requirement of a base station when the signal arrives to the base station. Alternatively, power control may be performed between a plurality of nodes and a plurality of nodes. For example, in a time division duplex (TDD) network mode, both uplink scheduling and downlink scheduling may be performed in a system (in which, for example, a dynamic TDD technology in a 5G network is used). In this case, the power control may be used to relate to a power requirement between a plurality of user equipment and a plurality of base stations in a network.

Power control is designed to control a transmit power of a signal of a node in a network, so that a received power of the signal meets a receiving requirement. Herein, the receiving requirement may be the power requirement, the SINR requirement, or the like described above, or may be a signal-to-noise ratio (SNR) requirement. An SNR, an SINR, IoT (interference over thermal, interference over thermal), an RSRP, and a received power of a signal may be all considered as target parameters in a power control phase. These parameters are not entirely equivalent, but are interrelated. For example, the SINR and the RSRP are not identically equal, but a higher RSRP indicates a better SINR of a signal at a same interference level. For power control in this specification, a target control parameter actually used in an algorithm is not limited.

The power control method provided in this embodiment of this application is applicable to a communications system in which dual connectivity technology is used. Actually, the dual connectivity technology refers to carrier aggregation under a premise of non-ideal backhaul. In other words, with the dual connectivity technology, one terminal can be connected to two base stations at the same time for data communication, where the two base stations are connected through the non-ideal backhaul. A typical scenario is that one base station is a macro cell and the other base station is a small cell. The macro cell and the small cell are connected through a standard X2 interface. In carrier aggregation in R10, one scheduler is used for scheduling of a plurality of carriers. However, in dual connectivity, a scheduler of the macro cell and a scheduler of the small cell are separately used for managing radio resources on their respective base stations, and therefore need to be coordinated with each other. This describes an essential difference between the dual connectivity and the carrier aggregation from the perspective of a system architecture. Compared with a carrier aggregation technology, the dual connectivity technology has an advantage of allowing system time asynchronization between the macro cell and the small cell.

Figure 2:
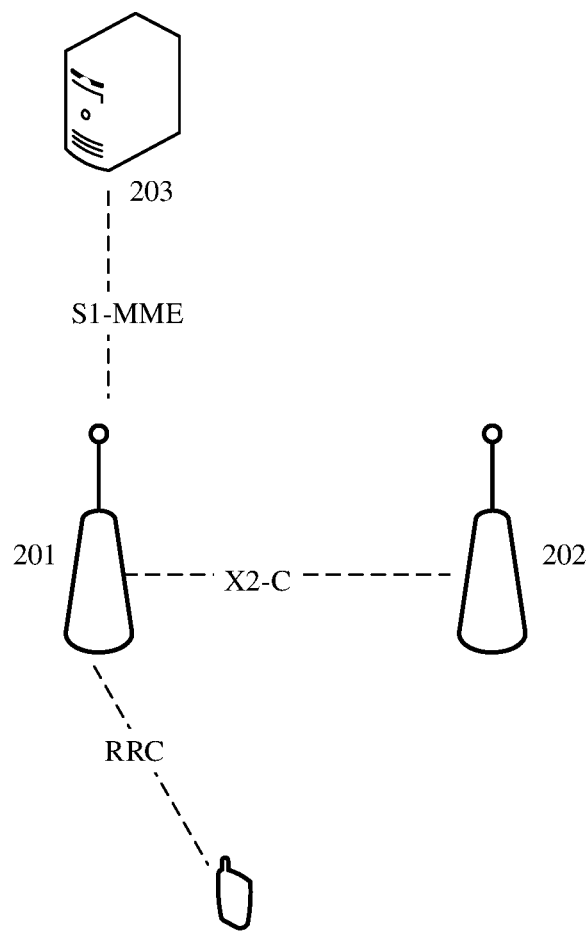
FIG. 2 is a topological diagram of a control plane architecture for dual connectivity according to an embodiment of this application.

FIG. 2 is a topological diagram of a control plane architecture for dual connectivity. 201 indicates an MeNB, and the MeNB is a macro cell. 202 indicates an SeNB, and the SeNB is a small cell. 203 indicates an MME, and the MME is a mobility management entity in a core network. A signaling connection between a terminal, the MeNB, and the MME 203 is the same as that in an existing system. In other words, one terminal has only one radio resource control (RRC) signaling link and one S1 signaling link. The SeNB and the MeNB are still connected through an X2 interface.

In FIG. 2, carrier aggregation may be configured on the MeNB and the SeNB separately. For further differentiation, all configured serving carriers on the MeNB are referred to as a master cell group (MCG), and all configured serving carriers on the SeNB are referred to as a secondary cell group (SCG,). A dual connectivity technology allows a terminal device to establish a connection to both the MCG and the SCG at the same time, to improve a throughput of a single user. In a dual connectivity scenario, the master cell group may alternatively be configured by more than one base station, and the secondary cell group may alternatively be configured by more than one base station.

In an LTE-LTE dual connectivity mode, uplink control information (UCI) may be sent on a PUCCH in the MCG and a PUCCH in the SCG at the same time. Because the the dual connectivity allows system time asynchronization between the MCG and the SCG, resource overlapping may occur in a transmission process of subframes in different cells during scheduling performed by the MeNB and the SeNB. The resource overlapping means that a time domain resource in the MCG overlaps a time domain resource in the SCG. According to a current protocol, the MCG and the SCG are configured with a maximum power $P_{MeNB}$ and a maximum power $P_{SeNB}$ respectively. A total power of carriers in the MCG cannot exceed $P_{MeNB}$. Similarly, a total power of carriers in the SCG cannot exceed $P_{SeNB}$. In addition, a sum of $P_{MeNB}$ and $P_{SeNB}$ cannot exceed a maximum power $P_{cmax}$ of all carriers. A power configured for each terminal device by the MeNB and the SeNB on a network side is allocated based on $\gamma_{MCG}$ and $\gamma_{SCG}$ respectively, where $\gamma_{MCG}$ and $\gamma_{SCG}$ represent percentages. To be specific, in the dual connectivity mode, a power value configured by the base station for each terminal device in each cell may be obtained by multiplying $P_{cmax}$ by $\gamma_{MCG}$ and by multiplying $P_{cmax}$ by $\gamma_{sCG}$.

In the LTE-LTE dual connectivity mode, the terminal device calculates $P_{cmax\_MeNB}$ and $P_{cmax\_SeNB}$ based on a maximum allowed transmit power $P_{emax}$ configured by the network side and a maximum allowed transmit power $P_{powerclass}$ of the UE. Then, $P_{cmax\_MeNB}$ and $P_{cmax\_SeNB}$ are used to calculate $P_{cmax\_dc}$. Finally, $\gamma_{MCG}$ and $\gamma_{SCG}$ each are used, to be specific, $P_{cmax}$ is multiplied by $\gamma_{MCG}$ and $P_{cmax}$ is multiplied by $\gamma_{SCG}$, to obtain a power value configured by the base station for each terminal device in each cell group in the dual connectivity mode.

In an E-UTRAN-LTE dual connectivity mode (which is briefly referred to as an EN-DC mode) in consideration of a network evolution step, it is currently considered by default that an E-UTRAN cell group is a master cell group and an NR cell group is a secondary cell group. Currently, dynamic power sharing is defined as a capability in a standard, a type of terminal with a dynamic power sharing capability is a first-type terminal, and a type of terminal without a corresponding capability is a second-type terminal. Herein, it may be understood that the second-type terminal can support semi-static power sharing. In the EN-DC mode, the master cell group may alternatively be an NR master cell group, and the secondary cell group may alternatively be an LTE secondary cell group.

Figure 3:
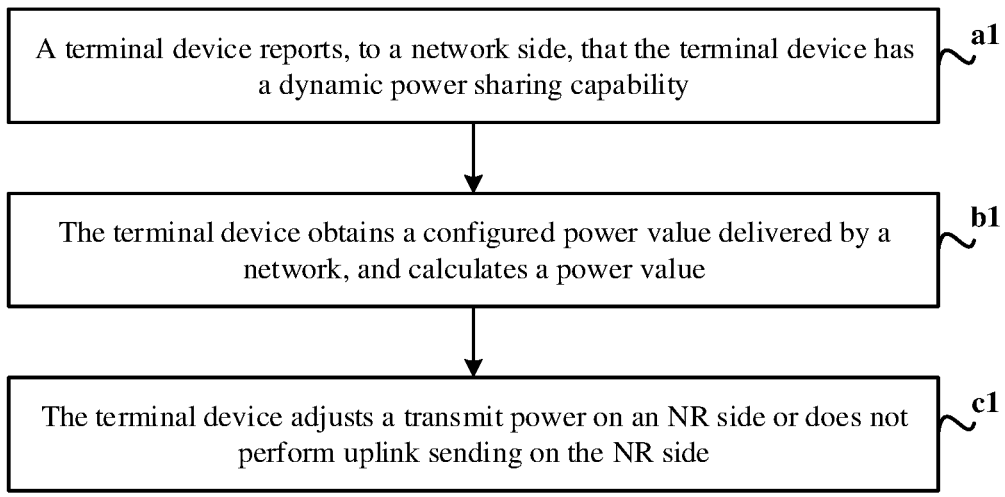
FIG. 3 is a schematic diagram of a communication method of a first-type terminal capable of dynamic power sharing according to an embodiment of this application.

A communication behavior of the first-type terminal capable of dynamic power sharing may be described with reference to FIG. 3, and a specific procedure is as follows:

Step a1: A terminal device reports, to a network side, that the terminal device has a dynamic power sharing capability.

Step b1: The terminal device obtains a configured power value delivered by a network, and obtains $P_{CMAX\_LTE}$, $P_{CMAX\_NR}$, and $P_{CMAX\_ENDC}$ through calculation.

Step c1: The terminal device determines, using a length of a slot in NR as a time unit, whether a sum of real-time powers on LTE and NR physical channels is greater than $P_{CMAX\_ENDC}$; and if the sum is greater than $P_{CMAX\_ENDC}$, the terminal device in the EN-DC mode adjusts a transmit power on an NR side or does not perform uplink sending on an NR side.

Figure 4:
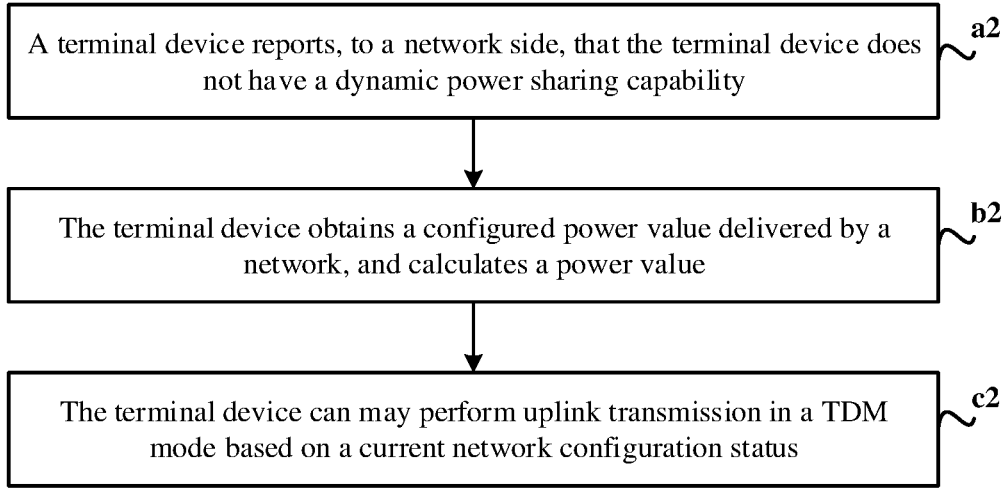
FIG. 4 is a schematic diagram of a communication method of a first-type terminal incapable of dynamic power sharing according to an embodiment of this application.

A communication behavior of the second-type terminal incapable of dynamic power sharing may be described with reference to FIG. 4, and a specific procedure is as follows:

Step a2: A terminal device reports, to a network side, that the terminal device does not have a dynamic power sharing capability.

Step b2: The terminal device obtains a configured power value delivered by a network, and obtains $P_{CMAX\_LTE}$, $P_{CMAX\_NR}$, and $P_{CMAX\_ENDC}$.

Step c2: The terminal device determines whether a sum of semi-static power configuration values $P_{CMAX\_LTE}$ and $P_{CMAX\_NR}$ is greater than $P_{CMAX\_ENDC}$, and the terminal device may perform uplink transmission in a TDM mode based on a current network configuration status.

However, a current 5G standard defines that in an EN-DC mode, maximum allowed transmit power absolute values are separately configured by a network side for a terminal device in an MCG and an SCG, and it is assumed that the maximum allowed transmit power absolute values are referred to as P_LTE and P_NR. E-UTRAN and NR are two different communications modes. Therefore, $P_{CMAX\_LTE}$, $P_{CMAX\_NR}$, and $P_{CMAX\_ENDC}$ need to be recalculated based on P_LTE, P_NR, and other related parameters such as $P_{EMAX}$ and $P_{powerclass}$.

Figure 5:
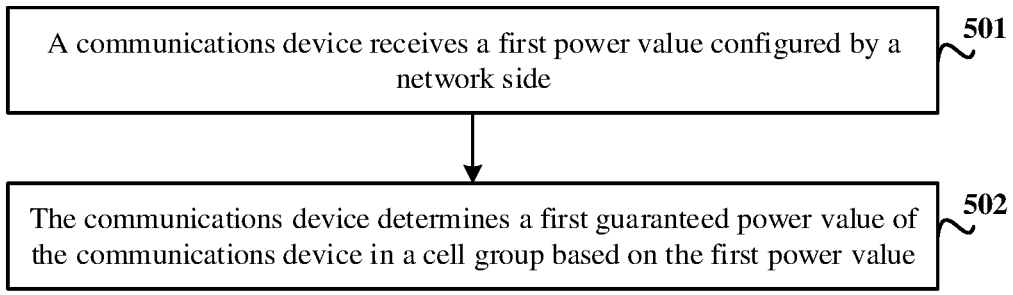
FIG. 5 is a schematic flowchart 1 of a power control method according to an embodiment of this application.

Based on the foregoing concepts, a specific process of a power control method is further described in detail in an embodiment of this application. Specific steps are shown in FIG. 5.

Step 501: A communications device receives a first power value configured by a network side, where the first power value is a maximum allowed transmit power value that is for a cell group and that is configured by the network side for the communications device.

Step 502: The communications device determines a first guaranteed power value of the communications device in the cell group based on the first power value.

Specifically, in the foregoing steps, the cell group may be the MCG or the SCG described above. In an EN-DC mode, the cell group includes one or more LTE cells when the cell group is the MCG; and the cell group includes one or more NR cells when the cell group is the SCG. In addition, when the cell group is the MCG, the first power value may be P_LTE, and the first guaranteed power value may be a maximum transmit power $P_{CMAX\_LTE}$ configured for the communications device in the MCG. Specifically, the first guaranteed power value may be a maximum transmit power $P_{CMAX\_LTE\_L,c}$ configured for the communications device in an LTE cell. When the cell group is the SCG, the first power value may be P_NR, and the first guaranteed power value may be a maximum transmit power $P_{CMAX\_NR}$ configured for the communications device in the SCG. For NR, there may be two uplink carriers in one cell, that is, an uplink carrier and a supplementary uplink carrier. Therefore, the first power guarantee value may be defined for the uplink carrier, or may be defined for the supplementary uplink carrier. The first guaranteed power value falls within a value range. To be specific, the first guaranteed power value falls between a lower limit $P_{CMAX\_L}$ and an upper limit $P_{CMAX\_H}$.

In this embodiment of this application, P_LTE and P_NR are power configuration values separately configured by the network side for the communications device in the EN-DC mode. Therefore, impact of a P_LTE value on $P_{CMAX\_LTE}$ or $P_{CMAX\_NR}$ need to be considered for the communications device. $P_{CMAX\_LTE}$ or $P_{CMAX\_NR}$ is a maximum transmit power value in power control. In the EN-DC mode, P_LTE and P_NR are substituted for calculating a maximum power on an LTE side or an NR side, so that independent semi-static power adjustment can be implemented. In addition, a network configuration requirement of EN-DC is met.

Specifically, in step 502, the communications device determines a minimum power value based on the first power value and at least one of a third power value and a fourth power value, and uses the minimum power value as the first guaranteed power value of the communications device in the cell group.

The third power value is a maximum allowed transmit power value, namely, $P_{EMAX,c}$, configured by the network side for the communications device. The fourth power value is a maximum allowed transmit power value, namely, $P_{powerclass}$, of the communications device.

In other words, for the LTE cell in the EN-DC mode, the terminal device obtains a first guaranteed power value $P_{CMAX\_LTE}$ of the terminal device in the LTE cell through calculation based on $P_{EMAX,c}$, a maximum allowed transmit power value $P_{powerclass\_LTE}$ of the communications device in the LTE cell group, and P_LTE that is configured by the network side. Calculation manners may be shown in formula [1], formula [2], and formula [3].

$$P_{CMAX\_LTE\_L,c} \leq P_{CMAX\_LTE,c} \leq P_{CMAX\_LTE\_H,c} \qquad \text{formula [1]}$$

$$P_{CMAX\_LTE\_L,c} = \text{MIN}\{P_{EMAX,c} - T_{c,c}, (P_{powerclass\_LTE} - \Delta P_{powerclass\_LTE}) - \text{MAX}(MPR_c + A - MPR_c + \Delta T_{IB,c} + \Delta T_{c,c} + \Delta T_{ProSe}p - MPR_c), P\_LTE - \Delta T_{c,c}\} \qquad \text{formula [2]}$$

$$P_{CMAX\_LTE\_H,c} = \text{MIN}\{P_{EMAX,c}, P_{powerclass\_LTE} - \Delta P_{powerclass\_LTE}, P\_LTE\} \qquad \text{formula [3]}$$

In formula [1], $P_{CMAX\_LTE,c}$ represents a configured power of the terminal device in an LTE cell, a lower limit of $P_{CMAX\_LTE,c}$ is $P_{CMAX\_LTE\_L,c}$, and an upper limit of $P_{CMAX\_LTE,c}$ is $P_{CMAX\_LTE\_H,c}$. In formula [2] and formula [3], $P_{EMAX,c}$ represents a maximum allowed transmit power value configured by the network side for the terminal through RRC signaling, and $P_{powerclass\_LTE}$ represents a maximum allowed transmit power value that can be used by the terminal device in the LTE cell group. $\Delta P_{powerclass\_LTE}$ represents a power adjustment value of the terminal device at a power class in some cases, MPRc represents a maximum power reduction value, which is a power reduction value for different bandwidth and RB allocation with a requirement of a radio frequency indicator. A–$MPR_c$ represents an additional power reduction value, to be specific, a power value by which a reduction can be further performed based on an MPR reduction through some network signaling. p–$MPR_c$ represents a power reduction value that is defined in consideration of a specific absorption rate. $\Delta T_{IB,c}$ represents a transmit power relaxation in consideration of carrier aggregation. $\Delta T_{c,c}$ represents a transmit power relaxation at a band edge. $\Delta T_{ProSe}$ represents a transmit power relaxation in LTE in which a proximity communications service (ProSe) (for example, an LTE D2D service) is supported.

Likewise, for the NR cell in the EN-DC mode, the terminal device obtains a first guaranteed power $P_{CMAX\_NR}$ of the terminal device in the NR cell through calculation based on $P_{EMAX,c}$, a maximum allowed transmit power value of the communications device in the NR cell group, and P_LTE that is configured by the network side. Calculation manners may be shown in formula [4], formula [5], and formula [6].

$$P_{CMAX\_LTE\_L,f,c} \leq P_{CMAX\_NR,f,c} \leq P_{CMAX\_H,f,c} \qquad \text{formula [4]}$$

$$P_{CMAX\_L,f,c} = \text{MIN}\{P_{EMAX,c} - \Delta, (P_{powerclass\_NR} - \Delta P_{powerclass\_NR}) - \text{MAX}(\text{MPR}_c + A - \text{MPR}_c + \Delta T_{IB,c} + \Delta T_{c,c}, P - \text{MPR}_c), P\_NR - \Delta T_{c,c}\} \qquad \text{formula [5]}$$

$$P_{CMAX\_H,f,c} = \text{MIN}\{P_{EMAX,c}, P_{powerclass\_NR} - \Delta P_{powerclass\_NR}, P\_NR\} \qquad \text{formula [6]}$$

In formula [4], $P_{CMAX\_NR,f,c}$ represents a configured power of the terminal device on a specific uplink carrier in an NR cell, a lower limit of $P_{CMAX\_NR,f,c}$ is $P_{CMAX\_L,f,c}$, and an upper limit of $P_{CMAX\_NR,f,c}$ is $P_{CMAX\_H,f,c}$. $P_{powerclass\_NR}$ represents a maximum allowed transmit power value that can be used by the terminal device in the NR cell group. MPRc represents a maximum power reduction value, which is a power reduction value for different bandwidth and RB allocations with a requirement of a radio frequency indicator. A–MPR$_c$ represents an additional power reduction value, to be specific, a power value by which a reduction can be further performed based on an MPR reduction through some network signaling. p–MPR$_c$ represents a power reduction value that is defined in consideration of a specific absorption rate. $\Delta T_{IB,c}$ represents a transmit power relaxation in consideration of carrier aggregation and dual connectivity. $\Delta T_{c,c}$ represents a transmit power relaxation at a band edge. Definitions of other parameters are the same as those of parameters in formula [1], formula [2], and formula [3].

Figure 6:
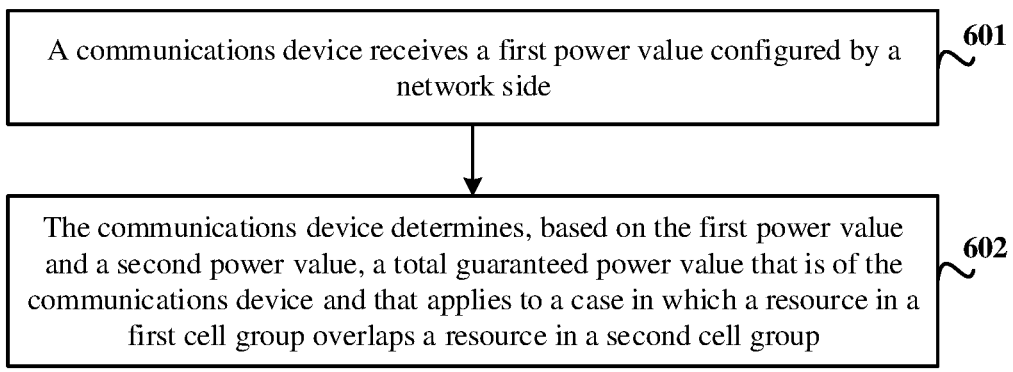
FIG. 6 is a schematic flowchart 2 of a power control method according to an embodiment of this application.

$P_{CMAX\_LTE}$ and $P_{CMAX\_NR}$ are obtained through calculation based on the foregoing formulas. Then, the communications device determines, based on the first power value and a second power value, a total guaranteed power value that is of the communications device and that applies to a case in which a resource in a first cell group overlaps a resource in a second cell group. In the EN-DC mode, it is currently considered by default that an E-UTRAN base station is a master base station and an NR base station is a secondary base station. Therefore, the first cell group may be understood as the MCG, and the second cell group may be understood as the SCG. In other words, the terminal device calculates a total transmit power value $P_{CMAX\_ENDC}$ in the EN-DC mode based on $P_{CMAX\_LTE}$ and $P_{CMAX\_NR}$. A specific process is shown in FIG. 6, and includes the following steps:

Step 601: The communications device receives the first power value and the second power value that are configured by the network side.

Step 602: The communications device determines, based on the first power value and the second power value, the total guaranteed power value that is of the communications device and that applies to the case in which a resource in the first cell group overlaps a resource in the second cell group.

Specifically, the communications device determines a minimum power value based on a sum of the first power value and the second power value, and at least one of the following power values: a sum of the first guaranteed power value and a second guaranteed power value, and a larger one of a fourth power value and a fifth power value.

Then, the communications device uses the minimum power value as the total guaranteed power value that is of the communications device and that applies to the case in which a resource in the first cell group overlaps a resource in the second cell group.

The fourth power value is a maximum allowed transmit power value, namely, $P_{powerclass\_LTE}$, of the communications device in the first cell group. The fifth power value is a maximum allowed transmit power value, namely, $P_{powerclass\_NR}$, of the communications device in the second cell group.

In this embodiment of this application, P_LTE and P_NR are considered in a process of calculating the total guaranteed power value. This can ensure that, for a communications device supporting dynamic power sharing, a sum of dynamic powers in each time unit does not exceed a sum of power configuration values, namely, P_LTE and P_NR, in the two cell groups in the EN-DC mode in an EN-DC power control process. In addition, this method also provides the base station with more freedom in power adjustment, and therefore a power control process of UE in the EN-DC mode is more flexible.

For subframe overlapping in the EN-DC dual connectivity mode, one LTE subframe may overlap a plurality of NR slots. This is mainly because a slot length varies with a subcarrier spacing value in NR. For example, in a schematic diagram of subframe overlapping shown in FIG. 7, the terminal device may obtain a total power value $P_{CMAX\_ENDC}$ (p,q) of an overlapping part between a subframe p in LTE and a slot q in NR through calculation based on $P_{CMAX\_LTE}$, $P_{CMAX\_NR}$, $P_{powerclass\_LTE}$, $P_{powerclass\_NR}$, and P_LTE and P_NR that are configured by the network side. A value of $P_{CMAX\_ENDC}(p,q)$ falls between a lower limit $P_{CMAX\_ENDC\_L}(p,q)$ and an upper limit $P_{CMAX\_ENDC\_H}(p,q)$. Calculation manners may be shown in formula [7], formula [8], and formula [9].

$$P_{powerclass\_ENDC} = \text{MAX}\{P_{powerclass\_LTE}, P_{powerclass\_NR}\} \qquad \text{formula [7]}$$

$$P_{CMAX\_ENDC\_L,c}(p,q) = \text{MIN}\{10 \log^{PCMAX\_L,c(1),1(p)+PCMAX\_L,c(2),2(q)}, P_{powerclass\_ENDC}, P\_LTE+P\_NR\} \qquad \text{formula [8]}$$

$$P_{CMAX\_ENDC\_H,c}(p,q) = \text{MIN}\{10 \log^{PCMAX\_H,c(1),1(p)+PCMAX\_H,c(2),2(q)}, P_{powerclass\_ENDC}, P\_LTE+P\_NR\} \qquad \text{formula [9]}$$

In formula [7], $P_{powerclass\_ENDC}$ represents the maximum power value in $P_{powerclass\_LTE}$ and $P_{powerclass\_NR}$. In formula [8], $P_{CMAX\_L,c(1)}^{1(p)}$ represents a lower limit of a first guaranteed power value of the communications device in the subframe p in the MCG, $P_{CMAX\_L,c(2)}^{2(q)}$ represents a lower limit of a second guaranteed power value of the communications device in the slot q in the SCG, and $P_{CMAX\_ENDC\_L,c}$ represents a lower limit of the total guaranteed power of the communications device. In formula [9], $P_{CMAX\_H,c(1)}^{1(p)}$ represents an upper limit of the first guaranteed power value of the communications device in the subframe p in the MCG, $P_{CMAX\_H,c(2)}^{2(q)}$ represents an upper limit of the second guaranteed power value of the communications device in the slot q in the SCG, and $P_{CMAX\_ENDC\_H,c}$ represents an upper limit of the total guaranteed power of the communications device.

In other words, the terminal device selects a minimum power value from values: $P_{cmax\_LTE} + P_{cmax\_NR}$, $P_{powerclass\_ENDC}$, and P_LTE+P_NR, uses the minimum power value as $P_{CMAX\_ENDC}$.

Figure 7:
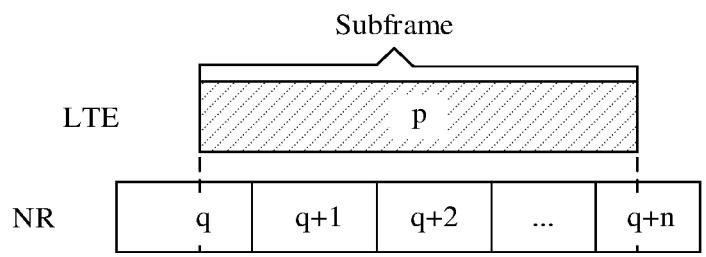
FIG. 7 is a schematic diagram of a case in which resources in different cell groups overlap according to an embodiment of this application.

It can be learned from FIG. 7 that, assuming that the subframe p in LTE further overlaps slots q+1 to q+n in NR, a total of N+1 total guaranteed power values, namely, $P_{CMAX\_ENDC\_L,c}(p,q+1)$, $P_{CMAX\_ENDC\_L,c}(p,q+2)$, ..., and $P_{CMAX\_ENDC\_L,c}(p,q+n)$, may be sequentially calculated based on formula [10]. Formula [10] is as follows:

$$P_{CMAX}(p,i) = \text{MIN}\{10 \log_{10}^{PCMAX,c(1),1(p)+PCMAX,c(2),2(i)}, P_{powerclass\_ENDC}, P\_LTE+p\_NR\} \qquad \text{formula [10]}$$

$P_{CMAX,c(1)}^{1(p)}$ represents a first guaranteed power value of the communications device in the subframe p in the first cell group. $P_{CMAX,c(2)}^{2(i)}$ represents a second guaranteed power value of the communications device in a slot i in the second cell group. $P_{powerclass\_ENDC}$ represents the maximum power value in the fourth power value and the fifth power value. p_LTE+p_NR represents the sum of the first power value and the second power value. $P_{CMAX}(p,i)$ represents a maximum allowed transmit power value of the communications device in the slot i, where a value of i ranges from q to q+n.

Further, the terminal device determines an upper limit and a lower limit of an actual total guaranteed power value based on $P_{CMAX\_ENDC,c}(p,q+1)$, $P_{CMAX\_ENDC,c}(p,q+2)$, ..., and $P_{CMAX\_ENDC,c}(p,q+n)$. Calculation manners may be shown in formula [11] and formula [12].

$$P'_{CMAX\_ENDC\_L,c}(p,q)=\text{MIN}\{P_{CMAX\_ENDC\_L,c}(p,q), P_{CMAX\_ENDC\_L,c}(p,q+1), \ldots, P_{CMAX\_ENDC\_L,c}(p,q+n)\} \quad \text{formula [11]}$$

$$P'_{CMAX\_ENDC\_H,c}(p,q)=\text{MAX}\{P_{CMAX\_ENDC\_H,c}(p,q), P_{CMAX\_ENDC\_H,c}(p,q+1), \ldots, P_{CMAX\_ENDC\_H,c}(p,q+n)\} \quad \text{formula [12]}$$

Figure 8:
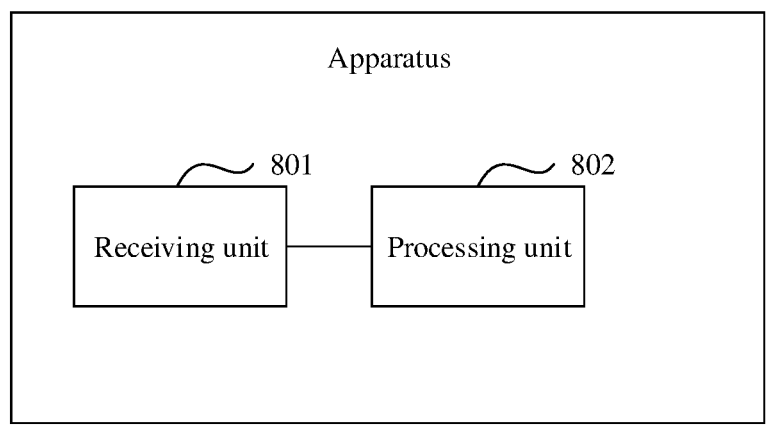
FIG. 8 is a schematic structural diagram of an apparatus according to an embodiment of this application.

It should be understood that the foregoing case is merely an example. In another case, the MCG may alternatively include one or more NR cells, and the SCG may alternatively include one or more LTE cells, or a next generation communications technology cell. For the transmission method process performed by the communications device, this application provides an apparatus. For specific execution content of the apparatus, refer to the foregoing method embodiments. FIG. 8 is a schematic structural diagram of an apparatus according to this application. The apparatus includes a receiving unit 801 and a processing unit 802.

The receiving unit 801 is configured to receive a first power value and a second power value that are configured by a network side, where the first power value is a maximum allowed transmit power value that is for a first cell group and that is configured by the network side for the communications device, and the second power value is a maximum allowed transmit power value that is for a second cell group and that is configured by the network side for the communications device.

The processing unit 802 is configured to determine, based on the first power value and the second power value, a total guaranteed power value that is of the communications device and that applies to a case in which a resource in the first cell group overlaps a resource in the second cell group.

In an embodiment, the communications device operates in a dual connectivity mode, and the dual connectivity mode indicates that the communications device can establish a connection to the first cell group and the second cell group at the same time.

In another embodiment, the first cell group includes one or more LTE cells, and the second cell group includes one or more NR cells.

In a possible design, the processing unit 802 is further configured to: determine a first guaranteed power value of the communications device in the first cell group based on the first power value; determine a second guaranteed power value of the communications device in the second cell group based on the second power value;

determine a minimum power value based on a sum of the first power value and the second power value, and at least one of the following power values: a sum of the first guaranteed power value and the second guaranteed power value, and a larger one of the fourth power value and the fifth power value; and use the minimum power value as the total guaranteed power value that is of the communications device and that applies to the case in which a resource in the first cell group overlaps a resource in the second cell group.

In another possible design, a time at which a subframe in the first cell group overlaps a subframe in the second cell group is a first time unit, the first time unit corresponds to a subframe p in the first cell group and corresponds to slots q to q+n in the second cell group, and a value of n indicates a time domain position of a last slot that is in the second cell group and that overlaps the subframe p in the first cell group.

The processing unit 802 is further configured to determine an actual total guaranteed power value based on n+1 total guaranteed power values corresponding to the slots q to q+n, where the actual total guaranteed power value is a maximum allowed transmit power value that can be used by the communications device in the first time unit.

During implementation of this application, these units may perform corresponding functions in the method example in the first aspect. For details, refer to the detailed descriptions in the method example. Details are not described herein again.

In this application, the communications device may be divided into function modules based on the foregoing method example. For example, function modules may be obtained through division based on corresponding functions, or two or more functions may be integrated into one processing module. The integrated module may be implemented in a form of hardware, or may be implemented in a form of a software functional module. It should be noted that, in this application, module division is an example and is merely logical function division. In actual implementation, another division manner may be used.

Figure 9:
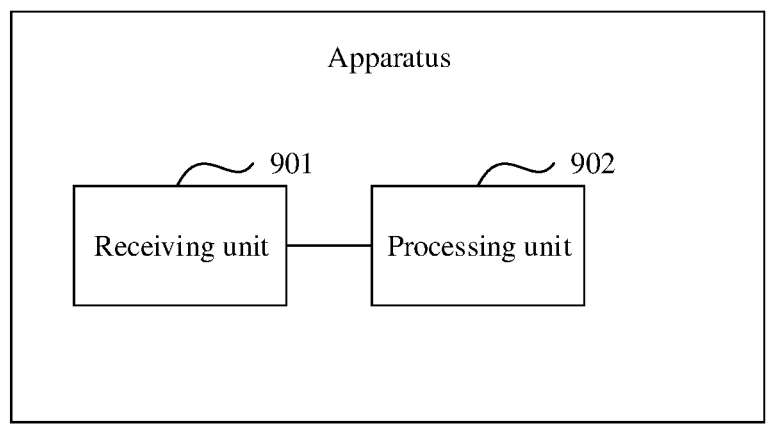
FIG. 9 is a schematic structural diagram of another apparatus according to an embodiment of this application.

For the transmission method process performed by the network device, this application provides an apparatus. For specific execution content of the apparatus, refer to the foregoing method embodiments. FIG. 9 is a schematic structural diagram of an apparatus according to this application. The apparatus includes a receiving unit 901 and a processing unit 902.

The receiving unit 901 is configured to receive a first power value configured by a network side, where the first power value is a maximum allowed transmit power value that is for a cell group and that is configured by the network side for the communications device.

The processing unit 902 is configured to determine a first guaranteed power value of the communications device in the cell group based on the first power value.

In a possible design, the processing unit 902 is specifically configured to: determine a minimum power value based on the first power value and at least one of a third power value and a fourth power value; and use the minimum power value as the first guaranteed power value of the communications device in the cell group.

The third power value is a maximum allowed transmit power value configured by the network side for the communications device that performs uplink transmission on a single carrier. The fourth power value is a maximum allowed transmit power value of the communications device in the first cell group.

The cell group includes one or more LTE cells, or one or more NR cells.

It should be understood that the apparatus may be configured to implement a step performed by the network device in the power control method provided in this application. For related features, refer to the foregoing descriptions. Details are not described herein again.

In this application, the network device may be divided into function modules based on the foregoing method example. For example, function modules may be obtained through division based on corresponding functions, or two or more functions may be integrated into one processing module. The integrated module may be implemented in a form of hardware, or may be implemented in a form of a software functional module. It should be noted that, in this application, module division is an example and is merely logical function division. In actual implementation, another division manner may be used.

Storage in this application may be storage in one or more memories. The one or more memories may be separately disposed, or may be integrated into an encoder or a decoder, a processor, a chip, a communications apparatus, or a terminal. Alternatively, some of the one or more memories may be separately disposed, and the others may be integrated into a decoder, a processor, a chip, a communications apparatus, or a terminal. A type of the memory may be any form of storage medium. This is not limited in this application.

Figure 10:
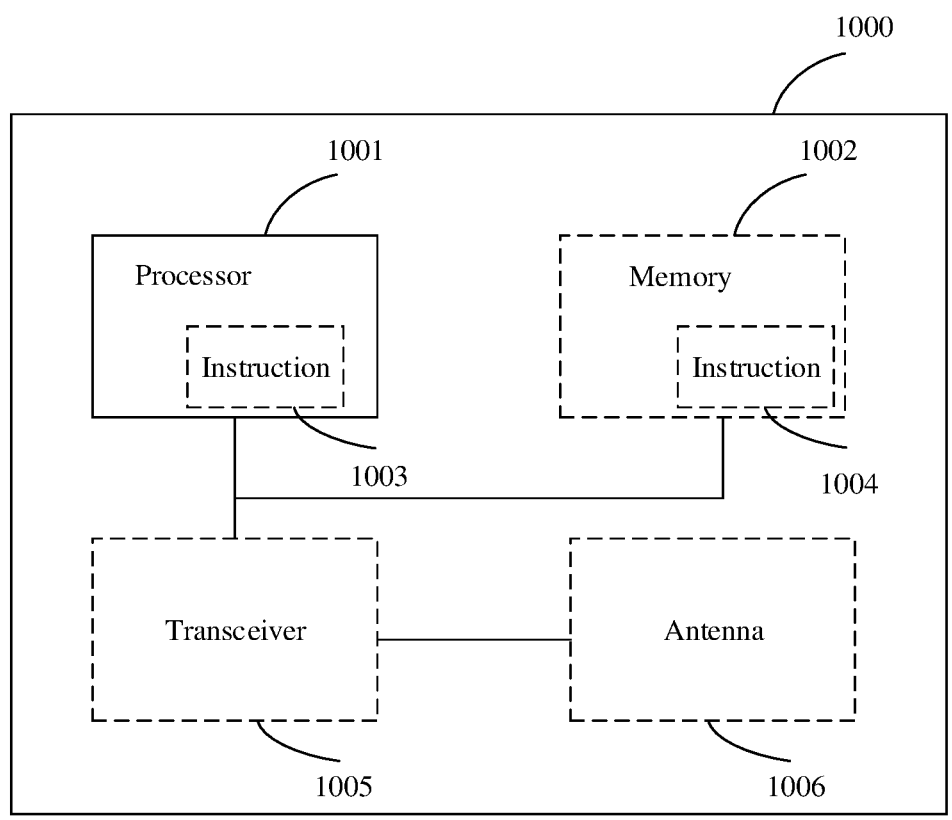
FIG. 10 is a schematic structural diagram of a communications apparatus according to an embodiment of this application.

An embodiment of this application further provides a communications apparatus. The communications apparatus includes a processor and a memory. The memory stores a computer program. When the processor reads and executes the computer program stored in the memory, the communications apparatus is enabled to perform the method performed by the communications device or the method performed by the network device in the processes shown in FIG. 5 and FIG. 6. FIG. 10 is a schematic structural diagram of a communications apparatus 1000. The apparatus 1000 may be configured to perform the method described in the foregoing method embodiments. Reference may be made to the descriptions in the foregoing method embodiments. The communications apparatus 1000 may be a chip, a base station, a terminal, or another network device.

The communications apparatus 1000 includes one or more processors 1001. The processor 1001 may be a general-purpose processor, a dedicated processor, or the like, for example, may be a baseband processor or a central processing unit. The baseband processor may be configured to process a communication protocol and communication data, and the central processing unit may be configured to: control the communications apparatus (such as a base station, a terminal, or a chip), execute a software program, and process data of the software program.

In a possible design, one or more modules in FIG. 5 and FIG. 6 may be implemented by one or more processors, or may be implemented by one or more processors and memories.

In a possible design, the communications apparatus 1000 includes one or more processors 1001, and the one or more processors 1001 may implement the foregoing power control function. For example, the communications apparatus may be a base station. For determining a power value, reference may be made to descriptions of related parts in FIG. 5 and FIG. 6. Details are not described herein again.

Optionally, in a design, the processor 1001 may include an instruction 1003 (which may sometimes also be referred to as code or a program). The instruction may be run on the processor, so that the communications apparatus 1000 performs the methods described in the foregoing embodiments. In still another possible design, the communications apparatus 1000 may alternatively include a circuit, and the circuit may implement the power control function in the foregoing embodiments.

Optionally, in a design, the communications apparatus 1000 may include one or more memories 1002, where the memory stores an instruction 1004. The instruction may be run on the processor, so that the communications apparatus 1000 performs the methods described in the foregoing method embodiments.

Optionally, the memory may further store data. Optionally, the processor may also store an instruction and/or data. The processor and the memory may be separately disposed, or may be integrated together.

Optionally, "storage" in the foregoing embodiments may be storage in the memory 1002, or may be storage in another peripheral memory or storage device.

Optionally, the communications apparatus 1000 may further include a transceiver 1005 and an antenna 1006. The processor 1001 may be referred to as a processing unit, and controls the communications apparatus (the terminal or the base station). The transceiver 1005 may be referred to as a transceiver unit, a transceiver circuit, a transceiver, or the like, and is configured to implement a transceiving function of the communications apparatus through the antenna 1006.

A specific implementation of the foregoing apparatus embodiments corresponds to that of the method embodiments. For the specific implementation and beneficial effects of the apparatus embodiments, refer to related descriptions in the method embodiments.

An embodiment of this application further provides a chip, where the chip is connected to a memory. The memory stores a computer program. The chip is configured to read and execute the computer program stored in the memory, to perform the method performed by the communications device in the process shown in FIG. 5 or in FIG. 6.

An embodiment of this application further provides a computer storage medium that stores program code. The stored program code is executed by a processor to implement the method of the communications device in the process shown in FIG. 5 in this application.

An embodiment of this application further provides a computer storage medium that stores program code. The stored program code is executed by a processor to implement the method of the communications device in the process shown in FIG. 6 in this application.

An embodiment of this application further provides a computer program product. The computer program product includes a computer software instruction, and the computer software instruction may be loaded by a processor to implement the method of the communications device in the process shown in FIG. 5 in this application.

An embodiment of this application further provides a computer program product. The computer program product includes a computer software instruction, and the computer software instruction may be loaded by a processor to implement the method of the network device in the process shown in FIG. 6 in this application.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), or a computer program product. Therefore, this application may use a form of hardware only embodiments, software only embodiments, or embodiments with a combination of software and hardware. They are collectively referred to as "modules" or "systems". Moreover, this application may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of hardware together with other hardware, or may be distributed in another form, for example, through the Internet or another wired or wireless telecommunications system.

This application is described with reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, it is clear that various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
receiving, by a device, a first power value and a second power value, wherein the first power value is a maximum allowed transmit power value that is configured by a network side for the device to use to communicate with a first cell group, and the second power value is a maximum allowed transmit power value that is configured by the network side for the device to use to communicate with a second cell group, and the first power value and the second power value are separately received by the device; and determining, by the device based on the first power value, a first guaranteed power value for the device to use when communicating with the first cell group; and determining, by the device based on the second power value, a second guaranteed power value for the device to use when communicating with the second cell group; and determining, by the device based on a sum of the first guaranteed power value and the second guaranteed power value, a total guaranteed power value for the device to use when a resource in the first cell group overlaps a resource in the second cell group, wherein the first guaranteed power value, satisfies a relation as follows:

$P_{CMAX\_LTE\_L,c} \leq P_{CMAX\_LTE,c} \leq P_{CMAX\_LTE\_H,c}$, wherein $P_{CMAX\_LTE\_L,c} = \text{MIN}\{P_{EMAX,c} - T_{c,c}, (P_{powerclass\_LTE} - \Delta P_{powerclass\_LTE}) - \text{MAX}(MPR_c + A - MPR_c + \Delta T_{IB,c} + \Delta T_{c,c} + \Delta T_{ProSe}, p - MPR_c), P\_LTE - \Delta T_{c,c}\}$, $P_{CMAX\_LTE\_H,c} = \text{MIN}\{P_{EMAX,c}, P_{powerclass\_LTE} - \Delta P_{powerclass\_LTE}, P\_LTE\}$, $P_{CMAX\_LTE,c}$ represents a configured power of the device in a long term evolution (LTE) cell, $P_{CMAX\_LTE\_L,c}$ represents a lower limit of $P_{CMAX\_LTE,c}$, and $P_{CMAX\_LTE\_H,c}$ represents an upper limit of $P_{CMAX\_LTE,c}$, $P_{EMAX,c}$ represents a maximum allowed transmit power value configured by the network side, $P_{powerclass\_LTE}$ represents a maximum allowed transmit power value that is usable in an LTE cell group, $\Delta P_{powerclass\_LTE}$ represents a power adjustment value of the device at a power class, MPRc represents a maximum power reduction value, $A-MPR_c$ represents an additional power reduction value, $p-MPR_c$ represents a power reduction value, $\Delta T_{IB,c}$ represents a transmit power relaxation in consideration of carrier aggregation, $\Delta T_{c,c}$ represents a transmit power relaxation at a band edge, $\Delta T_{ProSe}$ represents a transmit power relaxation in LTE corresponding to a proximity communications service, and P_LTE represents the first power value.

2. The method according to claim 1, wherein the device is operable in a dual connectivity mode, and in the dual connectivity mode the device establishes a connection to the first cell group and the second cell group at the same time.

3. The method according to claim 1, wherein the first cell group comprises one or more LTE cells, and the second cell group comprises one or more new radio (NR) cells.

4. The method according to claim 1, wherein a time at which a subframe in the first cell group overlaps a subframe in the second cell group is a first time unit, the first time unit corresponds to a subframe p in the first cell group and corresponds to slots q to q+n in the second cell group, and a value of n indicates a time domain position of a last slot that is in the second cell group and that overlaps the subframe p in the first cell group, and the method further comprises:

determining, by the device, an actual total guaranteed power value based on n+1 total guaranteed power values corresponding to the slots q to q+n, wherein the actual total guaranteed power value is a maximum allowed transmit power value that is usable by the device in the first time unit.

5. An apparatus, wherein the apparatus comprises:
a transceiver, configured to receive a first power value and a second power value, wherein the first power value is a maximum allowed transmit power value that is configured by a network side for a device to use to communicate with a first cell group, and the second power value is a maximum allowed transmit power value that is configured by the network side for the device to use to communicate with a second cell group, and wherein the first power value and the second power value are separately received; and
a processor, configured to:
  determine, based on the first power value, a first guaranteed power value for the device to use when communicating with the first cell group; and
  determine, based on the second power value, a second guaranteed power value for the device to use when communicating with the second cell group; and
  determine, based on a sum of the first guaranteed power value and the second guaranteed power value, a total guaranteed power value for the device to use when a resource in the first cell group overlaps a resource in the second cell group, wherein the first guaranteed power value, satisfies a relation as follows:

$$P_{CMAX\_LTE\_L,c} \leq P_{CMAX\_LTE,c} \leq P_{CMAX\_LTE\_H,c}, \text{ wherein}$$

$$P_{CMAX\_LTE\_L,c} = \text{MIN}\{P_{EMAX,c} - T_{c,c}, (P_{powerclass\_LTE} - \Delta P_{powerclass\_LTE}) - \text{MAX}(MPR_c + A - MPR_c + \Delta T_{IB,c} + \Delta T_{c,c} + \Delta T_{ProSe}p - MPR_c), P\_LTE - \Delta T_{c,c}\},$$

$$P_{CMAX\_LTE\_H,c} = \text{MIN}\{P_{EMAX,c}, P_{powerclass\_LTE} - \Delta P_{powerclass\_LTE}, P\_LTE\},$$

$P_{CMAX\_LTE,c}$ represents a configured power of the device in a long term evolution (LTE) cell, $P_{CMAX\_LTE\_L,c}$ represents a lower limit of $P_{CMAX\_LTE,c}$, and $P_{CMAX\_LTE\_H,c}$ represents an upper limit of $P_{CMAX\_LTE,c}$, $P_{EMAX,c}$ represents a maximum allowed transmit power value configured by the network side, $P_{powerclass\_LTE}$ represents a maximum allowed transmit power value that is usable in an LTE cell group, $\Delta P_{powerclass\_LTE}$ represents a power adjustment value of the device at a power class, MPRc represents a maximum power reduction value, A–MPR$_c$ represents an additional power reduction value, p–MPR$_c$ represents a power reduction value, $\Delta T_{IB,c}$ represents a transmit power relaxation in consideration of carrier aggregation, $\Delta T_{c,c}$ represents a transmit power relaxation at a band edge, $\Delta T_{ProSe}$ represents a transmit power relaxation in LTE corresponding to a proximity communications service, and P_LTE represents the first power value.

6. The apparatus according to claim 5, wherein the device is operable in a dual connectivity mode, and in the dual connectivity mode the device establishes a connection to the first cell group and the second cell group at a same time.

7. The apparatus according to claim 5, wherein the first cell group comprises one or more LTE cells, and the second cell group comprises one or more new radio (NR) cells.

8. The apparatus according to claim 5, wherein a time at which a subframe in the first cell group overlaps a subframe in the second cell group is a first time unit, the first time unit corresponds to a subframe p in the first cell group and corresponds to slots q to q+n in the second cell group, and a value of n indicates a time domain position of a last slot that is in the second cell group and that overlaps the subframe p in the first cell group; and the processor is configured to determine an actual total guaranteed power value based on n+1 total guaranteed power values corresponding to the slots q to q+n, wherein the actual total guaranteed power value is a maximum allowed transmit power value that is usable by the device in the first time unit.

9. A non-transitory storage medium, configure to store program instructions, wherein, when the program instructions are executed by a computer, the instructions cause a device to:
receive a first power value and a second power value, wherein the first power value is a maximum allowed transmit power value that is configured by a network side for the device to use to communicate with a first cell group, and the second power value is a maximum allowed transmit power value that is configured by the network side for the device to use to communicate with a second cell group, and wherein the first power value and the second power value are separately received; and
determine, based on the first power value, a first guaranteed power value for the device to use when communicating with the first cell group; and
determine, based on the second power value, a second guaranteed power value for the device to use when communicating with the second cell group; and
determine, based on a sum of the first guaranteed power value and the second guaranteed power value, a total guaranteed power value for the device to use when a resource in the first cell group overlaps a resource in the second cell group, wherein the first guaranteed power value satisfies a relation as follows:

$$P_{CMAX\_LTE\_L,c} \leq P_{CMAX\_LTE,c} \leq P_{CMAX\_LTE\_H,c}, \text{ wherein}$$

$$P_{CMAX\_LTE\_L,c} = \text{MIN}\{P_{EMAX,c} - T_{c,c}, (P_{powerclass\_LTE} - \Delta P_{powerclass\_LTE}) - \text{MAX}(MPR_c + A - MPR_c + \Delta T_{IB,c} + \Delta T_{c,c} + \Delta T_{ProSe}p - MPR_c), P\_LTE - \Delta T_{c,c}\},$$

$$P_{CMAX\_LTE\_H,c} = \text{MIN}\{P_{EMAX,c}, P_{powerclass\_LTE} - \Delta P_{powerclass\_LTE}, P\_LTE\},$$

$P_{CMAX\_LTE,c}$ represents a configured power of the device in a long term evolution (LTE) cell, $P_{CMAX\_LTE\_L,c}$ represents a lower limit of $P_{CMAX\_LTE,c}$, and $P_{CMAX\_LTE\_H,c}$ represents an upper limit of $P_{CMAX\_LTE,c}$, $P_{EMAX,c}$ represents a maximum allowed transmit power value configured by the network side, $P_{powerclass\_LTE}$ represents a maximum allowed transmit power value that is usable in an LTE cell group, $\Delta P_{powerclass\_LTE}$ represents a power adjustment value of the device at a power class, MPRc represents a maximum power reduction value, A–MPR$_c$ represents an additional power reduction value, p–MPR$_c$ represents a power reduction value, $\Delta T_{IB,c}$ represents a transmit power relaxation in consideration of carrier aggregation, $\Delta T_{c,c}$ represents a transmit power relaxation at a band edge, $\Delta T_{ProSe}$ represents a transmit power relaxation in LTE corresponding to a proximity communications service, and P_LTE represents the first power value.

10. The non-transitory storage medium according to claim 9, wherein the device is operable in a dual connectivity mode, and in the dual connectivity mode the device establishes a connection to the first cell group and the second cell group at a same time.

11. The non-transitory storage medium according to claim 9, wherein the first cell group comprises one or more LTE cells, and the second cell group comprises one or more new radio (NR) cells.

12. The non-transitory storage medium according to claim 9, wherein a time at which a subframe in the first cell group overlaps a subframe in the second cell group is a first time unit, the first time unit corresponds to a subframe p in the first cell group and corresponds to slots q to q+n in the second cell group, and a value of n indicates a time domain position of a last slot that is in the second cell group and that overlaps the subframe p in the first cell group, and the instructions further cause the device to:

determine an actual total guaranteed power value based on n+1 total guaranteed power values corresponding to the slots q to q+n, wherein the actual total guaranteed power value is a maximum allowed transmit power value that is usable by the device in the first time unit.

13. The non-transitory storage medium according to claim 9, wherein the first cell group and the second cell group operate using different scheduling granularities.

14. The non-transitory storage medium according to claim 9, wherein the first cell group and the second cell group operate using different communication protocols.

15. The method according to claim 1, wherein the second guaranteed power value satisfies a relation as follows:

$$P_{CMAX\_L,f,c} \leq P_{CMAX\_NR,f,c} \leq P_{CMAX\_H,f,c}, \text{ wherein}$$

$$P_{CMAX\_L,f,c} = \text{MIN}\{P_{EMAX,c} - \Delta, (P_{powerclass\_NR} - \Delta P_{powerclass\_NR}) - \text{MAX}(MPR_c + A - MPR_c + \Delta T_{IB,c} + \Delta T_{c,c}, P - MPR_c), P\_NR - \Delta T_{c,c}\}$$

$$P_{CMAX\_H,f,c} = \text{MIN}\{P_{EMAX,c}, P_{powerclass\_NR} - \Delta P_{powerclass\_NR}, P\_NR\}, \text{ and wherein}$$

$P_{CMAX\_NR,f,c}$ represents a configured power of the device on a specific uplink carrier in a new radio (NR) cell, $P_{CMAX\_L,f,c}$ represents a lower limit of $P_{CMAX\_NR,f,c}$ and $P_{CMAX\_H,f,c}$ represents an upper limit of $P_{CMAX\_NR,f,c}$, $P_{powerclass\_NR}$ represents a maximum allowed transmit power value that is usable by the device in a NR cell group, MPRc represents a maximum power reduction value, A–MPR$_c$ represents an additional power reduction value, p–MPR$_c$ represents a power reduction value, $\Delta T_{IB,c}$ represents a transmit power relaxation in consideration of carrier aggregation and dual connectivity, $\Delta T_{c,c}$ represents a transmit power relaxation at a band edge, and P_NR represents the first power value.

16. The apparatus according to claim 5, wherein the second guaranteed power value satisfies a relation as follows:

$$P_{CMAX\_L,f,c} \leq P_{CMAX\_NR,f,c} \leq P_{CMAX\_H,f,c}, \text{ wherein}$$

$$P_{CMAX\_L,f,c} = \text{MIN}\{P_{EMAX,c} - \Delta, (P_{powerclass\_NR} - \Delta P_{powerclass\_NR}) - \text{MAX}(MPR_c + A - MPR_c + \Delta T_{IB,c} + \Delta T_{c,c}, P - MPR_c), P\_NR - \Delta T_{c,c}\}$$

$$P_{CMAX\_H,f,c} = \text{MIN}\{P_{EMAX,c}, P_{powerclass\_NR} - \Delta P_{powerclass\_NR}, P\_NR\}, \text{ and wherein}$$

$P_{CMAX\_NR,f,c}$ represents a configured power of the device on a specific uplink carrier in a new radio (NR) cell, $P_{CMAX\_L,f,c}$ represents a lower limit of $P_{CMAX\_NR,f,c}$ and $P_{CMAX\_H,f,c}$ represents an upper limit of $P_{CMAX\_NR,f,c}$, $P_{powerclass\_NR}$ represents a maximum allowed transmit power value that is usable by the device in a NR cell group, MPRc represents a maximum power reduction value, A–MPR$_c$ represents an additional power reduction value, p–MPR$_c$ represents a power reduction value, $\Delta T_{IB,c}$ represents a transmit power relaxation in consideration of carrier aggregation and dual connectivity, $\Delta T_{c,c}$ represents a transmit power relaxation at a band edge, and P_NR represents the first power value.

17. The non-transitory storage medium according to claim 9, wherein the second guaranteed power value satisfies a relation as follows:

$$P_{CMAX\_L,f,c} \leq P_{CMAX\_NR,f,c} \leq P_{CMAX\_H,f,c}, \text{ wherein}$$

$$P_{CMAX\_L,f,c} = \text{MIN}\{P_{EMAX,c} - \Delta, (P_{powerclass\_NR} - \Delta P_{powerclass\_NR}) - \text{MAX}(MPR_c + A - MPR_c + \Delta T_{IB,c} + \Delta T_{c,c}, P - MPR_c), P\_NR - \Delta T_{c,c}\}$$

$$P_{CMAX\_H,f,c} = \text{MIN}\{P_{EMAX,c}, P_{powerclass\_NR} - \Delta P_{powerclass\_NR}, P\_NR\}, \text{ and wherein}$$

$P_{CMAX\_NR,f,c}$ represents a configured power of the device on a specific uplink carrier in a new radio (NR) cell, $P_{CMAX\_L,f,c}$ represents a lower limit of $P_{CMAX\_NR,f,c}$ and $P_{CMAX\_H,f,c}$ represents an upper limit of $P_{CMAX\_NR,f,c}$, $P_{powerclass\_NR}$ represents a maximum allowed transmit power value that is usable by the device in a NR cell group, MPRc represents a maximum power reduction value, A–MPR$_c$ represents an additional power reduction value, p–MPR$_c$ represents a power reduction value, $\Delta T_{IB,c}$ represents a transmit power relaxation in consideration of carrier aggregation and dual connectivity, $\Delta T_{c,c}$ represents a transmit power relaxation at a band edge, and P_NR represents the first power value.

* * * * *